US012803083B2

(12) United States Patent
Liu et al.

(10) Patent No.: US 12,803,083 B2
(45) Date of Patent: Nov. 17, 2026

(54) ENERGY STORAGE SYSTEM AND HEATING CONTROL METHOD FOR BATTERY PACK

(71) Applicant: Huawei Digital Power Technologies Co., Ltd., Shenzhen (CN)

(72) Inventors: Guodong Liu, Xi'an (CN); Baojuan Shang, Xi'an (CN); Xingwang Deng, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/999,431

(22) Filed: Dec. 23, 2024

(65) Prior Publication Data

US 2025/0210758 A1 Jun. 26, 2025

(30) Foreign Application Priority Data

Dec. 25, 2023 (CN) ......................... 202311800560.0

(51) Int. Cl.

*H01M 10/657* (2014.01)
*H01M 10/46* (2006.01)
*H01M 10/615* (2014.01)
*H01M 10/627* (2014.01)
*H01M 10/63* (2014.01)
*H02J 3/38* (2006.01)
(Continued)

(52) U.S. Cl.

CPC ......... *H01M 10/657* (2015.04); *H01M 10/46* (2013.01); *H01M 10/615* (2015.04); *H01M 10/627* (2015.04); *H01M 10/63* (2015.04); *H02J 3/38* (2013.01); *H01M 2220/10* (2013.01); *H02J 7/02* (2013.01); *H02J 2101/24* (2026.01)

(58) Field of Classification Search

CPC .................................................. H01M 10/657
See application file for complete search history.

(56) References Cited

U.S. PATENT DOCUMENTS 5,834,131 A * 11/1998 Lutz ...................... G05D 23/00 429/7
2009/0194520 A1* 8/2009 Lin ...................... H01M 10/63 429/7
2017/0170673 A1* 6/2017 Zhang ................ H01M 10/615
(Continued)

FOREIGN PATENT DOCUMENTS

CN 116404307 A 7/2023
WO 2023061278 A1 4/2023

*Primary Examiner* — Daniel Kessie
(74) *Attorney, Agent, or Firm* — Maier & Maier, PLLC

(57) ABSTRACT

A energy storage system includes battery pack and a controller. The battery pack includes an electrochemical cell, a heating film, a first switching transistor, and a first drive circuit. The heating film and the first switching transistor are connected in series, and then connected in parallel between a positive direct current bus and a negative direct current bus. The first drive circuit is configured to output a pulse signal, to drive the first switching transistor to be turned on and turned off. The controller is configured to: if a voltage between the positive direct current bus and the negative direct current bus is greater than a voltage threshold, reduce a duty cycle of the pulse signal; or if a voltage between the positive direct current bus and the negative direct current bus is less than or equal to a voltage threshold, increase a duty cycle of the pulse signal.

18 Claims, 12 Drawing Sheets

(51) Int. Cl.

*H02J 7/02* (2016.01)
*H02J 101/24* (2026.01)

(56) References Cited

U.S. PATENT DOCUMENTS

| | | | | |
|---|---|---|---|---|
| 2017/0352931 | A1* | 12/2017 | Yoshida | H01M 10/643 |
| 2020/0350649 | A1 | 11/2020 | Liu et al. | |
| 2021/0323442 | A1* | 10/2021 | Wu | H01M 10/32 |
| 2022/0077833 | A1* | 3/2022 | Krabbenborg | H03F 3/45475 |
| 2024/0374944 | A1* | 11/2024 | Chang | H02J 7/0014 |
| 2025/0010689 | A1* | 1/2025 | Kwon | H02S 40/425 |
| 2025/0070298 | A1* | 2/2025 | Xu | H02J 7/0047 |

* cited by examiner

ENERGY STORAGE SYSTEM AND HEATING CONTROL METHOD FOR BATTERY PACK

CROSS-REFERENCE TO RELATED APPLICATION

This application claims priority to Chinese Patent Application No. 202311800560.0, filed on Dec. 25, 2023, which is hereby incorporated by reference in its entirety.

TECHNICAL FIELD

The embodiments relate to the battery field, and to an energy storage system and a heating control method for a battery pack.

BACKGROUND

In a process of charging a battery, a temperature of the battery has great impact on charging efficiency. Usually, the battery has low charging efficiency or even cannot be charged at a low temperature. In some environments, condensation may occur in the battery, which affects battery safety.

Currently, the battery may be heated by using a heating film. An operating principle of the heating film is to convert electric energy into thermal energy based on electrothermal effect, to heat an electrochemical cell. In most existing heating solutions, the heating film and a switching transistor are used for control: a controller controls the switching transistor to be directly turned on, so that the heating film operates to heat the battery. However, the heating film has rated heating power, and voltage fluctuation between a positive direct current bus and a negative direct current bus affects operating power of the heating film. Especially when a voltage between the positive direct current bus and the negative direct current bus increases, the operating power of the heating film is excessively high. As a result, the heating film is damaged.

SUMMARY

The embodiments provide an energy storage system and a heating control method for a battery pack, so that excessively high operating power of a heating film can be avoided, and a risk of damage to the heating film can be reduced.

According to a first aspect, an energy storage system is provided, including one or more battery packs and a controller. The battery pack includes an electrochemical cell, a heating film, a first switching transistor, and a first drive circuit. The heating film is configured to heat the electrochemical cell. The heating film and the first switching transistor are connected in series, and then connected in parallel between a positive direct current bus and a negative direct current bus. The first drive circuit is configured to output a pulse signal, to drive the first switching transistor to be turned on and turned off. The controller is configured to: if a voltage between the positive direct current bus and the negative direct current bus is greater than a voltage threshold, reduce a duty cycle of the pulse signal, to reduce operating power of the heating film; or if a voltage between the positive direct current bus and the negative direct current bus is less than or equal to a voltage threshold, increase a duty cycle of the pulse signal, to increase operating power of the heating film.

In this embodiment, the signal output by the first drive circuit is a pulse signal. Therefore, even if the voltage between the positive direct current bus and the negative direct current bus changes, the duty cycle of the pulse signal output by the first drive circuit can be set to control the operating power of the heating film, so that excessively high operating power of the heating film can be avoided, and a risk of damage to the heating film can be reduced. For example, if the voltage between the positive direct current bus and the negative direct current bus is greater than the voltage threshold, the controller reduces the duty cycle of the pulse signal, so that the operating power of the heating film can be reduced, and the risk of damage to the heating film can be reduced. If the voltage between the positive direct current bus and the negative direct current bus is less than or equal to the voltage threshold, the controller increases the duty cycle of the pulse signal, so that the operating power of the heating film can be increased, and efficiency of heating the electrochemical cell by the heating film can be improved.

In addition, because the signal output by the first drive circuit is a pulse signal, the duty cycle of the pulse signal output by the first drive circuit can be set to adapt to heating films of different specifications, to implement multi-scenario application.

In a possible implementation, the energy storage system includes a current detection circuit and an isolating circuit. The current detection circuit is configured to detect a current flowing through the first switching transistor. The isolating circuit includes an isolating switch. The current detection circuit, the isolating switch, the heating film, and the first switching transistor are connected in series, and then connected in parallel between the positive direct current bus and the negative direct current bus. Before the heating film operates, the controller is configured to: first turn on the isolating switch, and if the current flowing through the first switching transistor is not zero, then turn off the isolating switch; or first turn on the isolating switch, and if the current flowing through the first switching transistor is zero, then turn on the first switching transistor.

In this embodiment, before the heating film operates, the controller first turns on the isolating switch. If the current flowing through the first switching transistor is not zero, it indicates that the first switching transistor is faulty. If the first switching transistor is forcibly turned on, damage to the first switching transistor may be further aggravated; and more seriously, the heating film may be damaged. Therefore, in this case, the first switching transistor cannot be turned on. The controller may turn off the isolating switch. After the isolating switch is turned off, it is equivalent to that a fault current caused by a fault of the first switching transistor is cut off, to facilitate subsequent maintenance or replacement of the first switching transistor. Before the heating film operates, the controller first turns on the isolating switch. If the current flowing through the first switching transistor is zero, it indicates that the first switching transistor is not faulty. In this case, the controller may turn on the first switching transistor, so that the heating film can heat the electrochemical cell. In this manner, a safety status of the first switching transistor can be pre-detected, so that the heating film can safely and reliably heat the electrochemical cell, and damage to the heating film can be avoided.

In a possible implementation, the isolating circuit further includes a second drive circuit and a second switching transistor. The second drive circuit is configured to drive the second switching transistor to be turned on or turned off. The second switching transistor is connected in series to a coil of the isolating switch. The second switching transistor is turned on, the coil generates a magnetic field, and the isolating switch is turned on; or the second switching transistor is turned off, the coil does not generate a magnetic field, and the isolating switch is turned off.

In this embodiment, when the current detection circuit detects that the current flowing through the first switching transistor is not zero, it indicates that the first switching transistor is faulty, and the first switching transistor cannot be turned on. In this case, the controller controls the second drive circuit to output a low level, to turn off the isolating switch. When the current detection circuit detects that the current flowing through the first switching transistor is zero, it indicates that the first switching transistor is not faulty. In this case, the controller controls the second drive circuit to output a high level, to turn on the isolating switch. Further, when the isolating switch is turned off, because the isolating circuit includes the isolating switch, physical isolation can be implemented, so that isolation reliability can be improved.

In a possible implementation, the current detection circuit includes a first resistor and an operational amplifier. The first resistor is connected in series to the first switching transistor. A non-inverting input end of the operational amplifier is connected to one end of the first resistor. An inverting input end of the operational amplifier is connected to the other end of the first resistor. An output end of the operational amplifier is connected to the controller.

In this embodiment, the first resistor in the current detection circuit is connected in series to the first switching transistor, and a current flowing through the first resistor is consistent with the current flowing through the first switching transistor. The non-inverting input end of the operational amplifier is connected to the one end of the first resistor, and the inverting input end of the operational amplifier is connected to the other end of the first resistor. The output end of the operational amplifier is connected to the controller. Therefore, the input ends of the operational amplifier input a voltage between the two ends of the first resistor, and the output end of the operational amplifier outputs an amplified voltage of the first resistor. The controller may control, based on an obtained voltage, the duty cycle of the pulse signal output by the first drive circuit, to control an operating current of the heating film, and avoid damage to the heating film.

In a possible implementation, the current detection circuit further includes a second resistor, two diodes, and a voltage source. The second resistor is connected in series between the controller and the output end of the operational amplifier. An anode of one of the diodes is connected to a connection point of the second resistor and the controller, and a cathode of the one of the diodes is connected to the voltage source. A cathode of the other diode is connected to the connection point of the second resistor and the controller, and an anode of the other diode is connected to a reference ground.

In this embodiment, a main function of the two diodes is to avoid an excessively high pin voltage input to the controller, so that a risk of damage to a pin of the controller is reduced. For example, when the output end of the operational amplifier is short-circuited to a positive supply rail, one of the diodes is conducted. Alternatively, when the output end of the operational amplifier is short-circuited to a negative supply rail, the other diode is conducted. Because the second resistor is designed, based on a current forward characteristic of the diode, a voltage and a current are approximately in a linear relationship. Because a current flowing through the second resistor decreases, a voltage at a connection point of the controller and the operational amplifier can be reduced. In other words, the pin voltage flowing into the controller decreases. Therefore, the risk of damage to the pin of the controller can be reduced.

According to a second aspect, a heating control method for a battery pack is provided. The method includes: if a voltage between a positive direct current bus and a negative direct current bus is greater than a voltage threshold, reducing a duty cycle of a first switching transistor, to reduce operating power of a heating film, where the first switching transistor and the heating film are connected in series, and then connected in parallel between the positive direct current bus and the negative direct current bus, and the heating film is configured to heat an electrochemical cell of the battery pack; or if a voltage between a positive direct current bus and a negative direct current bus is less than or equal to a voltage threshold, increasing a duty cycle of a first switching transistor, to increase operating power of a heating film.

In a possible implementation, before the heating film operates, the method further includes: first turning on an isolating switch, and if a current flowing through the first switching transistor is not zero, then turning off the isolating switch, where the isolating switch is connected in series to the first switching transistor; or first turning on an isolating switch, and if a current flowing through the first switching transistor is zero, then turning on the first switching transistor.

In a possible implementation, the turning on an isolating switch includes: controlling a second drive circuit to output a high-level signal. A second switching transistor is turned on, and a coil in the isolating switch generates a magnetic field, to turn on the isolating switch. The second drive circuit is configured to drive the second switching transistor to be turned on or turned off. The second switching transistor is connected in series to the coil.

In a possible implementation, the turning off the isolating switch includes: controlling the second drive circuit to output a low-level signal. The second switching transistor is turned off, and the coil in the isolating switch does not generate the magnetic field, to turn off the isolating switch. The second drive circuit is configured to drive the second switching transistor to be turned on or turned off. The second switching transistor is connected in series to the coil.

For any effect that may be achieved in the second aspect, refer to descriptions of effects that can be achieved in any possible implementation of the first aspect. Details are not described herein again.

According to a third aspect, a photovoltaic energy storage system is provided. The photovoltaic energy storage system includes a power converter and the energy storage system according to any one of the first aspect. The power converter is configured to convert a direct current from the energy storage system into an alternating current, and then send the alternating current to a power grid; or the power converter is configured to convert an alternating current from a power grid into a direct current, to charge the energy storage system.

For any effect that may be achieved in the third aspect, refer to descriptions of effects that can be achieved in any possible implementation of the first aspect. Details are not described herein again.

DETAILED DESCRIPTION OF EMBODIMENTS

The following describes solutions of the embodiments with reference to the accompanying drawings.

For ease of understanding, the following first briefly describes terms used in the embodiments.

Parasitic capacitance: an unintentional capacitance phenomenon existing in a circuit. The parasitic capacitance is generated due to close proximity between wires, conductors, and electronic components. As a result, electric charges accumulate between different elements, to form capacitance effect.

Figure 1:
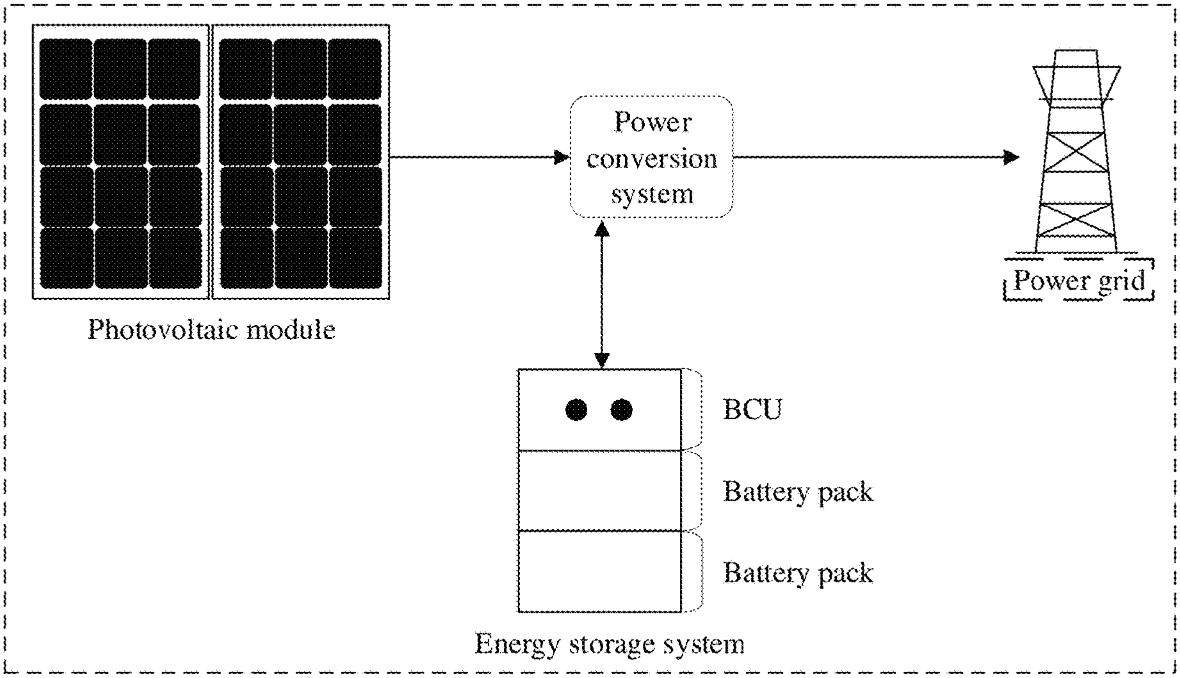
FIG. 1 is a diagram of a scenario applicable to the embodiments.

FIG. 1 is a diagram of a possible scenario applicable to the embodiments. Refer to FIG. 1. A photovoltaic module converts solar energy into a direct current based on photovoltaic effect, and a power conversion system converts the direct current into an alternating current and then sends the alternating current to a power grid. Alternatively, the power conversion system may convert a direct current from an energy storage battery into an alternating current, and then send the alternating current to the power grid. Alternatively, the power conversion system may convert an alternating current from the power grid into a direct current, to charge the energy storage battery. An energy storage system includes a battery control unit (BCU) and a battery pack.

Figure 2:
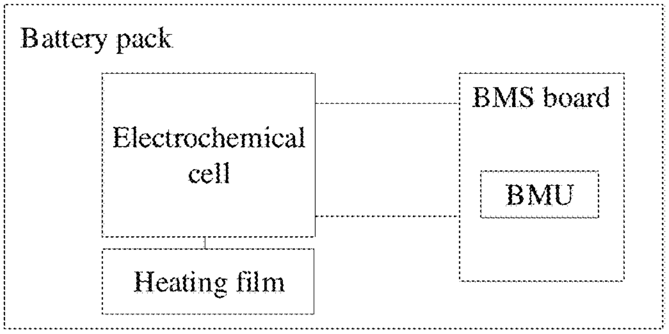
FIG. 2 is a diagram of a battery pack.

FIG. 2 is a diagram of a battery pack. The battery pack includes an electrochemical cell, a heating film, and a battery management system (BMS). A battery management unit (BMU) in the BMS is configured to control charging and discharging of the electrochemical cell. The BMU may further detect a temperature of the electrochemical cell. In a charging process of the electrochemical cell, if the temperature of the electrochemical cell is excessively low, the BMU may control the heating film to heat the electrochemical cell, to improve charging efficiency and ensure battery safety.

An operating principle of the heating film is to convert electric energy into thermal energy based on electrothermal effect, to heat the electrochemical cell. The electric energy comes from a voltage between a positive direct current bus and a negative direct current bus of an energy storage system. In most existing heating solutions, the heating film and a switching transistor are used for control. A controller controls the switching transistor to be directly turned on, so that the heating film operates to heat a battery. However, the heating film has rated heating power, and voltage fluctuation between the positive direct current bus and the negative direct current bus affects operating power of the heating film. Also, when the voltage between the positive direct current bus and the negative direct current bus increases, the operating power of the heating film is excessively high. As a result, the heating film is damaged.

Based on this, the embodiments provide an energy storage system. A duty cycle of a pulse signal is controlled, so that operating power of a heating film can be controlled, to avoid excessively high operating power of the heating film and reduce a risk of damage to the heating film.

Figure 3:
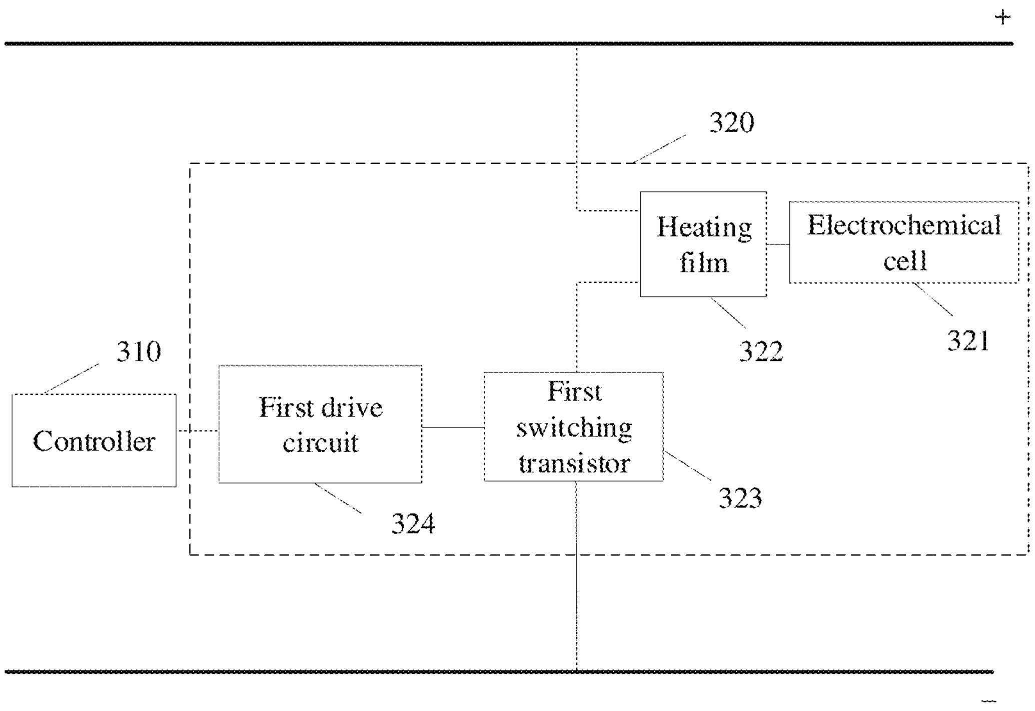
FIG. 3 is a schematic of an energy storage system according to an embodiment.

FIG. 3 is a schematic of an energy storage system according to an embodiment. The energy storage system includes one or more battery packs 320 and a controller 310. The battery pack 320 includes an electrochemical cell 321, a heating film 322, a first switching transistor 323, and a first drive circuit 324. The heating film 322 is configured to heat the electrochemical cell 321.

The heating film 322 and the first switching transistor 323 are connected in series, and then connected in parallel between a positive direct current bus and a negative direct current bus.

The first drive circuit 324 is configured to output a pulse signal, to drive the first switching transistor 323 to be turned on and turned off.

The first switching transistor 323 in this embodiment may be a triode or a metal-oxide-semiconductor field-effect transistor (MOSFET), or may be an insulated gate bipolar transistor (IGBT) or a gallium nitride (GaN) high electron mobility transistor (HEMT), or the like.

In this embodiment, the first drive circuit 324 outputs the pulse signal. That is, in each periodicity corresponding to the pulse signal, the first switching transistor is in an on state in some duration, and is in an off state in the other duration. When the first switching transistor is turned on, a voltage between the positive direct current bus and the negative direct current bus is applied to the heating film, and the heating film starts to operate, that is, the heating film starts to heat the electrochemical cell. When the first switching transistor is turned off, a voltage between the positive direct current bus and the negative direct current bus is not applied to the heating film, and the heating film stops operating, that is, the heating film stops heating the electrochemical cell.

The controller 310 is configured to: if the voltage between the positive direct current bus and the negative direct current bus is greater than a voltage threshold, reduce a duty cycle of the pulse signal, to reduce operating power of the heating film 322. The controller 310 is further configured to: if the voltage between the positive direct current bus and the negative direct current bus is less than or equal to a voltage threshold, increase a duty cycle of the pulse signal, to increase operating power of the heating film 322.

In some situations, the heating film has corresponding rated power. When the voltage between the positive direct current bus and the negative direct current bus is greater than the voltage threshold, the operating power of the heating film is greater than the rated power of the heating film. If the heating film heats the electrochemical cell at this operating power, the heating film is damaged. When the voltage between the positive direct current bus and the negative direct current bus is less than or equal to the voltage threshold, the operating power of the heating film may be less than the rated power of the heating film. If the heating film heats the electrochemical cell at this operating power, heating efficiency is reduced. Therefore, in this embodiment, the duty cycle of the pulse signal of the first drive circuit is controlled to control a status of the first switching transistor, so as to control the operating power of the heating film.

For example, if the voltage between the positive direct current bus and the negative direct current bus is greater than the voltage threshold, the controller controls to reduce the duty cycle of the pulse signal. When the duty cycle of the pulse signal decreases, it indicates that the duration in which the first switching transistor is turned on in each periodicity decreases, so that the operating power of the heating film can be reduced. if the voltage between the positive direct current bus and the negative direct current bus is less than or equal to the voltage threshold, the controller controls to increase the duty cycle of the pulse signal. When the duty cycle of the pulse signal increases, it indicates that the duration in which the first switching transistor is turned on in each periodicity increases, so that the operating power of the heating film can be increased.

In this embodiment, to avoid excessively high operating power of the heating film, the controller may control average operating power output by the heating film in each periodicity to be less than the rated power of the heating film.

In this embodiment, the average operating power output by the heating film in each periodicity may be expressed as:

$$W = \frac{U * U}{R} * \frac{t_{on}}{T}$$

W is the average operating power of the heating film in each periodicity. U is the voltage between the positive direct current bus and the negative direct current bus. R is a resistance value of the heating film. $t_{on}$ is the duration in which the first switching transistor is turned on. T is the periodicity corresponding to the pulse signal.

For example, the rated power of the heating film is 10 kW. It is assumed that the voltage between the positive direct current bus and the negative direct current bus is 360 V, and the operating power of the heating film is 15 kW. If the heating film continuously heats the electrochemical cell at the operating power of 15 kW, because the heating film heats the electrochemical cell at the operating power greater than the rated power of the heating film for long time, the heating film may be damaged. Therefore, the duty cycle of the pulse signal may be controlled, so that the operating power of the heating film is reduced. For example, the duty cycle may be controlled to be 0.6. In this case, the average operating power of the heating film for heating the electrochemical cell in each periodicity is 9 kW, which is less than the rated power of the heating film.

When the voltage between the positive direct current bus and the negative direct current bus increases, the operating power of the heating film changes to 18 kW. In this case, the duty cycle of the pulse signal output by the first drive circuit may be reduced. For example, the duty cycle may be adjusted from 0.6 to 0.5. In this case, the average power of the heating film for heating the electrochemical cell in each periodicity is 9 kW, that is, is still less than the rated power of the heating film, so that a risk of damage to the heating film can be reduced.

When the voltage between the positive direct current bus and the negative direct current bus decreases, the operating power of the heating film changes to 7 kW. In this case, the duty cycle of the pulse signal output by the first drive circuit may be increased. For example, the duty cycle may be adjusted from 0.6 to 1.0. In this case, the average power of the heating film for heating the electrochemical cell in each periodicity is 7 kW. Although the duty cycle is adjusted to 1, that is, the heating film continuously heats the electrochemical cell at the operating power of 7 kW, the heating film is not damaged, and a requirement for battery temperature raising can be further met to a greatest extent.

It should be noted that the controller controls the average operating power output by the heating film in each periodicity to be less than the rated power of the heating film, so that safety of the heating film can be ensured. In some embodiments, the average operating power output by the heating film in each periodicity may not be limited to being less than the rated power of the heating film. For example, an average operating power output by the heating film in one periodicity is slightly greater than the rated power of the heating film, and an average operating power output by the heating film in another periodicity is less than the rated power of the heating film.

In addition, the solution in this embodiment may match heating films of different specifications. This is because the signal output by the first drive circuit in this embodiment is a pulse signal, and heating films of different specifications can be used through adjustment of the duty cycle of the pulse signal.

For example, as described above, rated power of a heating film is 10 kW. When the voltage between the positive direct current bus and the negative direct current bus is 360 V, and operating power of the heating film is 15 kW, the duty cycle of the pulse signal may be set to 0.6. In this case, average operating power of the heating film for heating the electrochemical cell in each periodicity is 9 kW, which is less than the rated power 10 kW of the heating film.

For another example, when rated power of a heating film is 7 kW, and operating power of the heating film is still 15 kW, the duty cycle of the pulse signal may be set to 0.4. In this case, average power of the heating film for heating the electrochemical cell in each periodicity is 6 kW, which is less than the rated power 7 kW of the heating film.

In this embodiment, the signal output by the first drive circuit is a pulse signal. Therefore, even if the voltage between the positive direct current bus and the negative direct current bus changes, the duty cycle of the pulse signal output by the first drive circuit can be set to control the operating power of the heating film, so that excessively high operating power of the heating film can be avoided, and the risk of damage to the heating film can be reduced. In addition, because the signal output by the first drive circuit is a pulse signal, the duty cycle of the pulse signal output by the first drive circuit can be set to adapt to heating films of different specifications, to implement multi-scenario application.

In addition, in this embodiment, because the duty cycle of the pulse signal output by the first drive circuit is adjustable, a power requirement for heating the electrochemical cell by the heating film can be met through adjustment of the duty cycle of the pulse signal, and there is no need to add an additional voltage conversion circuit to adapt to the power requirement. Therefore, this embodiment is easy to implement and has low costs.

As described above, the first switching transistor and the heating film are connected in series, and then connected in parallel between the positive direct current bus and the negative direct current bus. The voltage between the positive direct current bus and the negative direct current bus may fluctuate. As a result, a current flowing through the heating film changes. Therefore, the controller may alternatively control the duty cycle of the pulse signal based on the current flowing through the heating film. For specific content, refer to the following.

In an embodiment, in an operating process of the heating film, the controller is further configured to: if the current flowing through the heating film is greater than a current threshold, reduce the duty cycle; or if the current flowing through the heating film is less than or equal to a current threshold, increase the duty cycle.

In this embodiment, when the voltage between the positive direct current bus and the negative direct current bus increases, the current flowing through the heating film increases, and may exceed a rated current (such as the current threshold) of the heating film, which causes damage to the heating film. When the voltage between the positive direct current bus and the negative direct current bus decreases, the current flowing through the heating film decreases, which cannot meet the requirement for battery temperature raising. Therefore, when the current flowing through the heating film changes, the controller may adjust, based on the current change, the duty cycle of the pulse signal output by the first drive circuit, to control an operating current of the heating film, avoid an excessively large operating current of the heating film, and meet the requirement for battery temperature raising.

In the foregoing example, the rated current of the heating film is 30 A. It is assumed that the voltage between the positive direct current bus and the negative direct current bus is 360 V, the operating power of the heating film is 15 kW, and the operating current of the heating film is 41.67 A. If the heating film continuously heats the electrochemical cell at the operating current of 41.67 A, the heating film may be damaged. Therefore, the duty cycle of the pulse signal may be controlled. For example, the duty cycle may be controlled to be 0.6. In this case, an average operating current of the heating film for heating the electrochemical cell in each periodicity is 25 A, which is less than the rated current of the heating film.

When the voltage between the positive direct current bus and the negative direct current bus increases, the operating power of the heating film changes to 18 kW, and the operating current of the heating film changes to 50 A. In this case, the duty cycle of the pulse signal output by the first drive circuit may be reduced. For example, the duty cycle may be adjusted from 0.6 to 0.5. In this case, the average operating current of the heating film for heating the electrochemical cell in each periodicity is 25 A, that is, is still less than the rated current of the heating film, so that the risk of damage to the heating film can be reduced.

When the voltage between the positive direct current bus and the negative direct current bus decreases, the operating power of the heating film changes to 7 kW. In this case, the duty cycle of the pulse signal output by the first drive circuit may be increased. For example, the duty cycle may be adjusted from 0.6 to 1.0. In this case, the average operating current of the heating film for heating the electrochemical cell in each periodicity is 19.45 A. Although the duty cycle is adjusted to 1, that is, the heating film continuously heats the electrochemical cell at the operating current of 19.45 A, the heating film is not damaged, and the requirement for battery temperature raising can be further met to a greatest extent.

Figure 4:
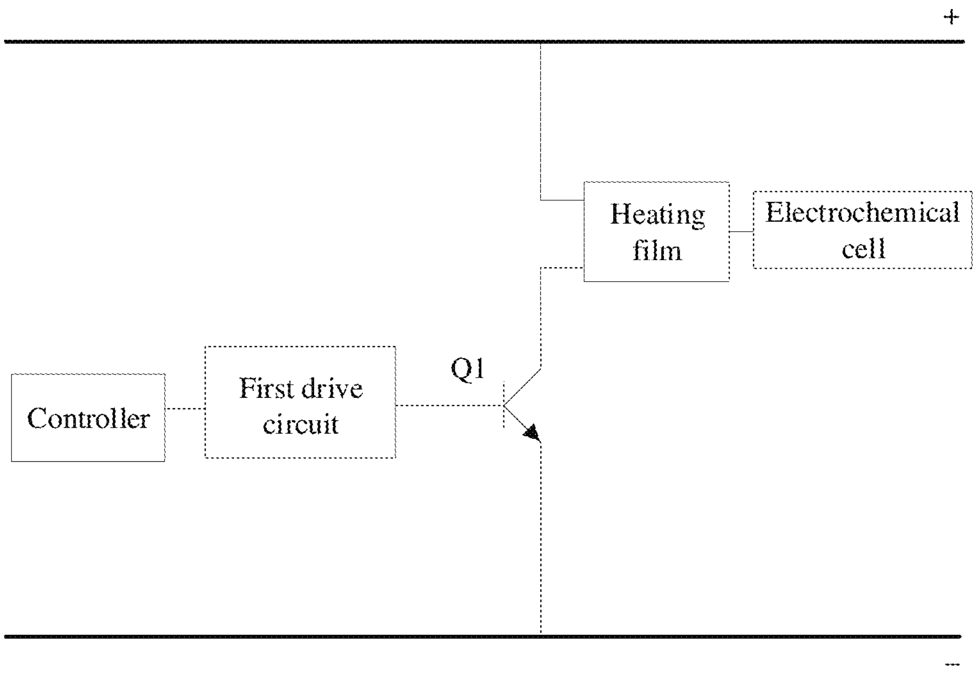
FIG. 4 is a schematic of an energy storage system according to an embodiment.

The following uses an example in which the first switching transistor is a triode for description. FIG. 4 is a schematic of another energy storage system according to an embodiment.

Refer to FIG. 4. A base of a first switching transistor Q1 is connected to a first drive circuit, an emitter of the first switching transistor Q1 is connected to a negative direct current bus, and a collector of the first switching transistor Q1 is connected to a positive direct current bus.

In this embodiment, when the first drive circuit outputs a high level, the first switching transistor Q1 is turned on, a voltage between the positive direct current bus and the negative direct current bus is applied to a heating film, and the heating film starts to operate, that is, the heating film starts to heat an electrochemical cell. When the first drive circuit outputs a low level, the first switching transistor Q1 is turned off, a voltage between the positive direct current bus and the negative direct current bus is not applied to a heating film, and the heating film stops operating, that is, the heating film stops heating an electrochemical cell. A duty cycle of a pulse signal output by the first drive circuit can be set to control operating power of the heating film, so that excessively high operating power of the heating film can be avoided, and a risk of damage to the heating film can be reduced.

Figure 5:
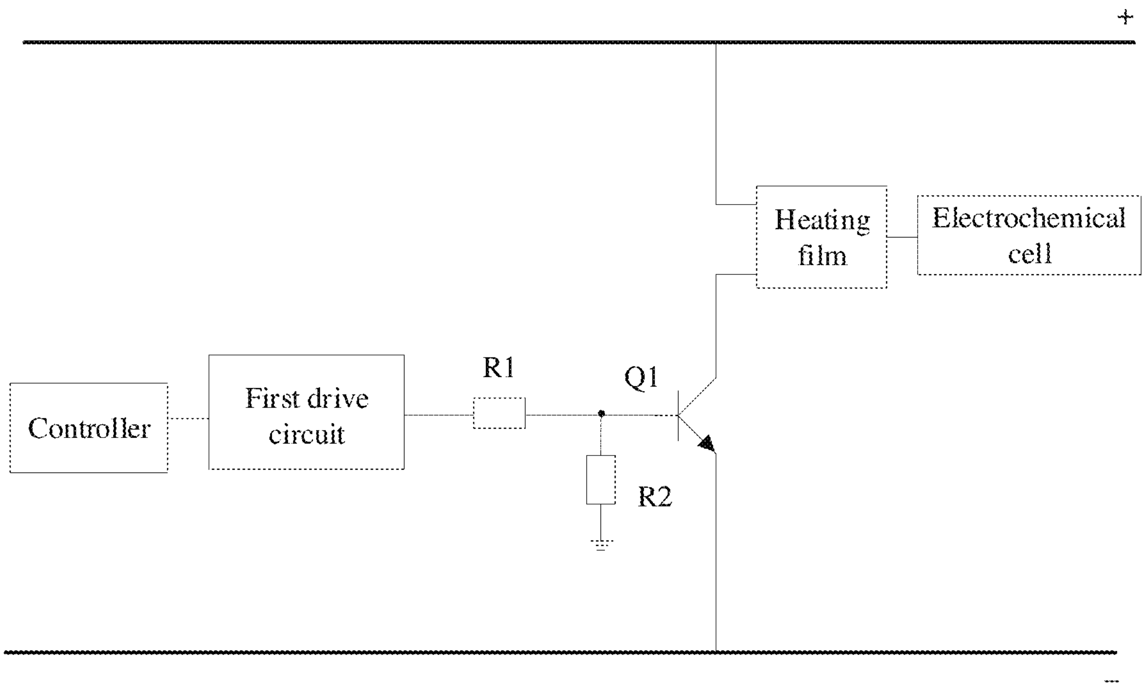
FIG. 5 is a schematic of an energy storage system according to an embodiment.

FIG. 5 is a schematic of still another energy storage system according to an embodiment.

In an embodiment, a resistor R1 is further connected in series between a first drive circuit and a base of a first switching transistor Q1.

In this embodiment, a voltage of a drive signal output by the first drive circuit is high. If there is no resistor R1, the first switching transistor Q1 may be damaged. For example, it is assumed that the voltage corresponding to the drive signal output by the first drive circuit is 12 V. If there is no resistor R1, a current corresponding to the 12 V voltage is input to the base of the first switching transistor Q1, and the current may be greater than a limiting current that can be borne by the base of the first switching transistor Q1, which causes damage to the first switching transistor Q1.

However, in this embodiment, because the first drive circuit is connected to the base of the first switching transistor Q1 through the resistor R1, the current corresponding to the voltage output by the first drive circuit flows into the base of the first switching transistor Q1 through the resistor R1. A resistance value of a loop in which the first drive circuit drives the Q1 through the resistor R1 increases, so that a base current flowing into the first switching transistor Q1 can be reduced, and damage to the first switching transistor Q1 can be avoided.

For example, a turn-on voltage of the first switching transistor Q1 is still 3.4 V. It is assumed that a voltage corresponding to a high-level signal output by the first drive circuit is 12 V. If a resistance value of the resistor R1 is sufficiently large, the resistor R1 may reduce the base current flowing into the first switching transistor Q1 to be less than the limiting current that can be borne by the base of the first switching transistor Q1. For example, it is assumed that the limiting current that can be borne by the base of the first switching transistor Q1 is 5 mA. When the resistance value of the resistor R1 is sufficiently large, for example, 1000Ω, the base current flowing into the first switching transistor Q1 may be reduced, for example, reduced to 4 mA, which is less than the limiting current that can be borne by the base of the first switching transistor Q1, so that damage to the first switching transistor Q1 can be avoided.

In this embodiment, because the resistor is connected in series between the first drive circuit and the base of the first switching transistor, impedance of the loop in which the first drive circuit drives the first switching transistor through the resistor increases. Therefore, the current flowing into the base of the first switching transistor can be reduced, so that damage to the first switching transistor can be avoided.

In an embodiment, a connection point of the first drive circuit and the first switching transistor is connected to a reference ground through a resistor R2.

In this embodiment, parasitic capacitance may exist in the first switching transistor Q1, and existence of the parasitic capacitance causes a transmission delay of the signal. When the parasitic capacitance of the first switching transistor Q1 is large, rise time and fall time of the signal increase, which affects a response speed of the first switching transistor. For example, if there is no resistor R2, when the first drive circuit outputs a high-level signal, a turn-on speed of the first switching transistor is affected; or when the first drive circuit outputs a low-level signal, a turn-off speed of the first switching transistor is affected.

In this embodiment, because the resistor R2 is designed, and the base of the first switching transistor Q1 is connected to the reference ground through the resistor R2, energy on the parasitic capacitance may be discharged through the resistor R2, so that a turn-on or turn-off speed of the first switching transistor caused by the parasitic capacitance can be reduced.

In addition, the resistor R2 may also play a role of reliably turning off the first switching transistor Q1. For example, when the first drive circuit outputs the low-level signal, the first switching transistor Q1 is turned off. However, because the voltage output by the first drive circuit is transmitted to the base of the first switching transistor Q1 through a line on a printed circuit board (PCB), coupling interference occurs, which causes incorrect turn-on of the first switching transistor Q1. In this embodiment, because the resistor R2 is designed, and the other end of the resistor R2 is connected to the reference ground, a base voltage of the first switching transistor Q1 can be pulled down, and reliable turn-off of the first switching transistor Q1 can be ensured.

The PCB in this embodiment may be designed on a BMS board shown in FIG. 2.

Figure 6:
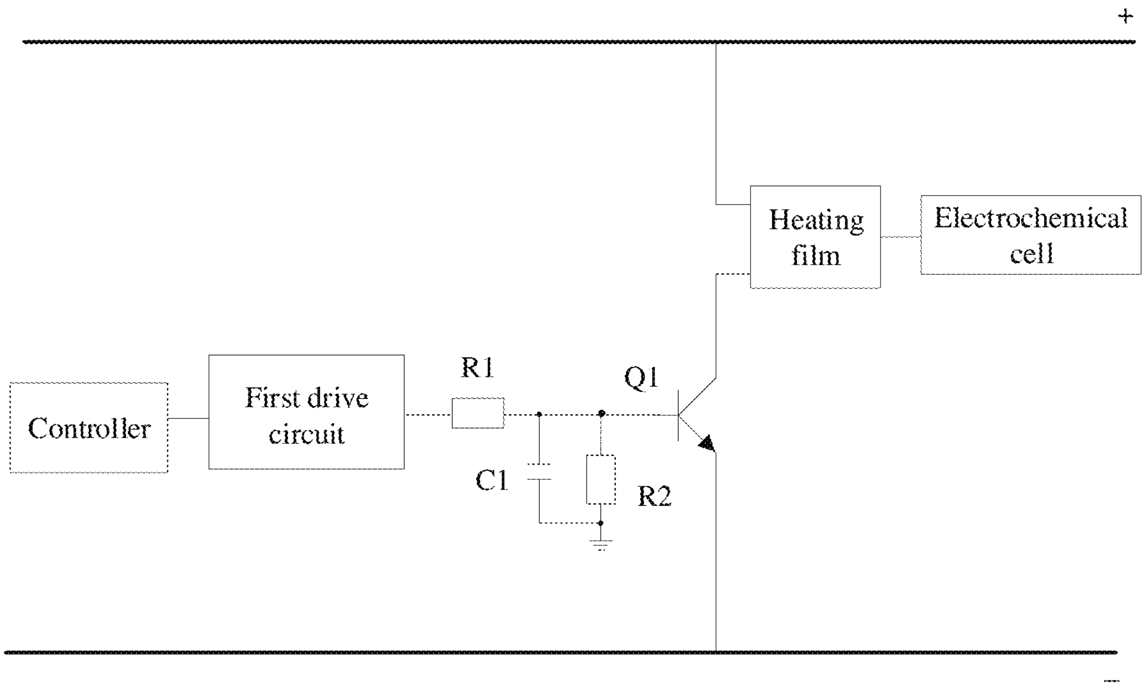
FIG. 6 is a schematic of an energy storage system according to an embodiment.

FIG. 6 is a schematic of yet another energy storage system according to an embodiment.

In an embodiment, a connection point of a resistor R1 and a first switching transistor Q1 is connected to one end of a capacitor C1, and the other end of the capacitor C1 is connected to a reference ground.

In this embodiment, a first drive circuit outputs a pulse signal. Because a voltage output by the first drive circuit is transmitted to a base of the first switching transistor Q1 through a line on a PCB, coupling interference occurs, which causes a misoperation of the first switching transistor Q1. The resistor R1 and the capacitor C1 in this embodiment may filter out interference, so that the pulse signal input to the base of the first switching transistor is a smooth pulse signal, and the misoperation of the first switching transistor caused by interference can be avoided.

The following further describes a process of detecting a safety status of a first switching transistor.

Figure 7:
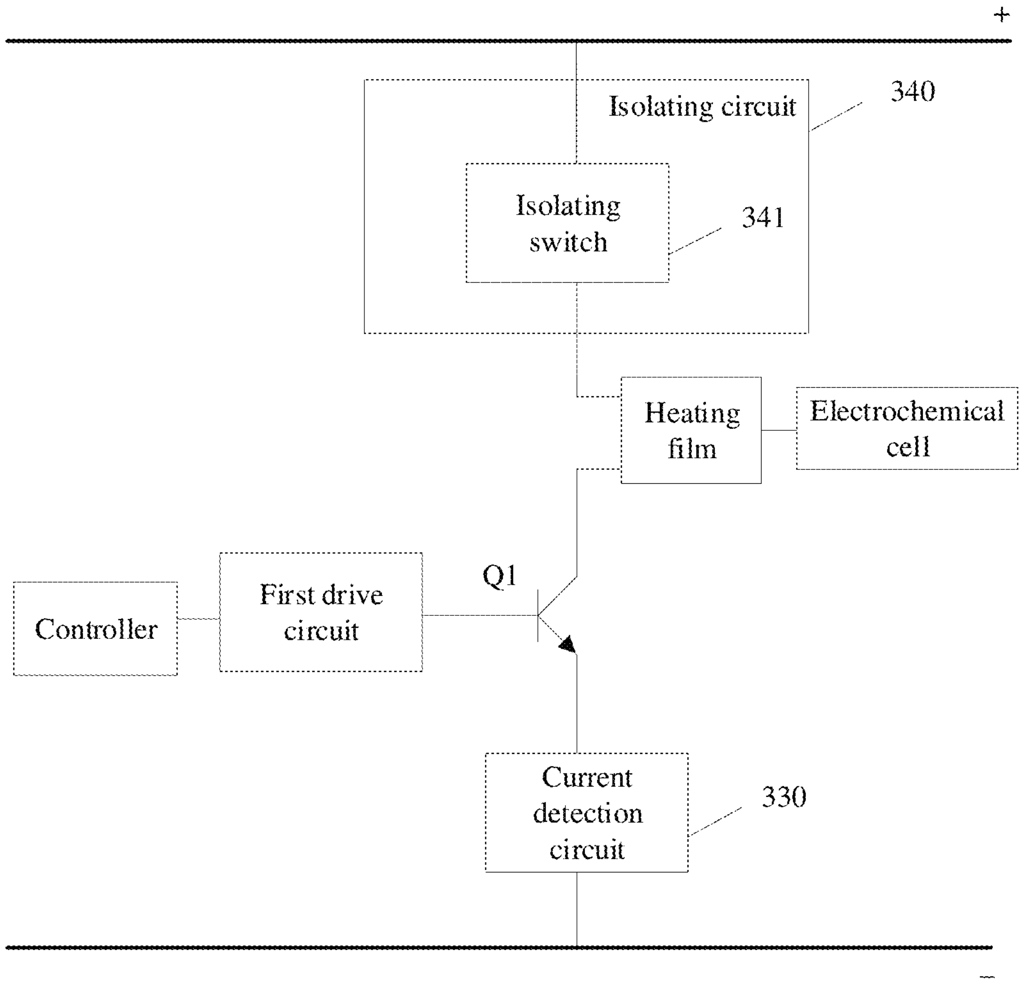
FIG. 7 is a schematic of an energy storage system according to an embodiment.

In an embodiment, as shown in FIG. 7, an energy storage system includes a current detection circuit 330 and an isolating circuit 340. The current detection circuit 330 is configured to detect a current flowing through the first switching transistor. The isolating circuit 340 includes an isolating switch 341. The current detection circuit 330, the isolating switch 341, a heating film 322, and the first switching transistor 323 are connected in series, and then connected in parallel between a positive direct current bus and a negative direct current bus.

Before the heating film operates, a controller 310 is configured to:

first turn on the isolating switch, and if the current flowing through the first switching transistor is not zero, then turn off the isolating switch; or first turn on the isolating switch, and if the current flowing through the first switching transistor is zero, then turn on the first switching transistor.

In this embodiment, because the current detection circuit 330 is connected in series to the first switching transistor, the current detection circuit 330 may detect the current flowing through the first switching transistor. Before the heating film operates, the first switching transistor is in an off state. After the isolating switch is turned on, because the first switching transistor is in the off state, if the first switching transistor is normal, the current flowing through the first switching transistor should be zero; or if the first switching transistor is abnormal, the current flowing through the first switching transistor should not be zero.

After the isolating switch is turned on, when the current detection circuit 330 detects that the current flowing through the first switching transistor is not zero, it indicates that the first switching transistor is faulty. If the first switching transistor is forcibly turned on, damage to the first switching transistor may be further aggravated; and more seriously, the heating film may be damaged. Therefore, in this case, the first switching transistor cannot be turned on. The controller may turn off the isolating switch 341. After the isolating switch is turned off, it is equivalent to that a fault current caused by a fault of the first switching transistor is cut off, to facilitate subsequent maintenance or replacement of the first switching transistor. After the isolating switch is turned on, when the current detection circuit 330 detects that the current flowing through the first switching transistor is zero, it indicates that the first switching transistor is not faulty. In this case, the controller may turn on the first switching transistor, so that the heating film can heat an electrochemical cell. In this manner, the safety status of the first switching transistor can be pre-detected, so that the heating film can safely and reliably heat the electrochemical cell, and damage to the heating film can be avoided.

Figure 8:
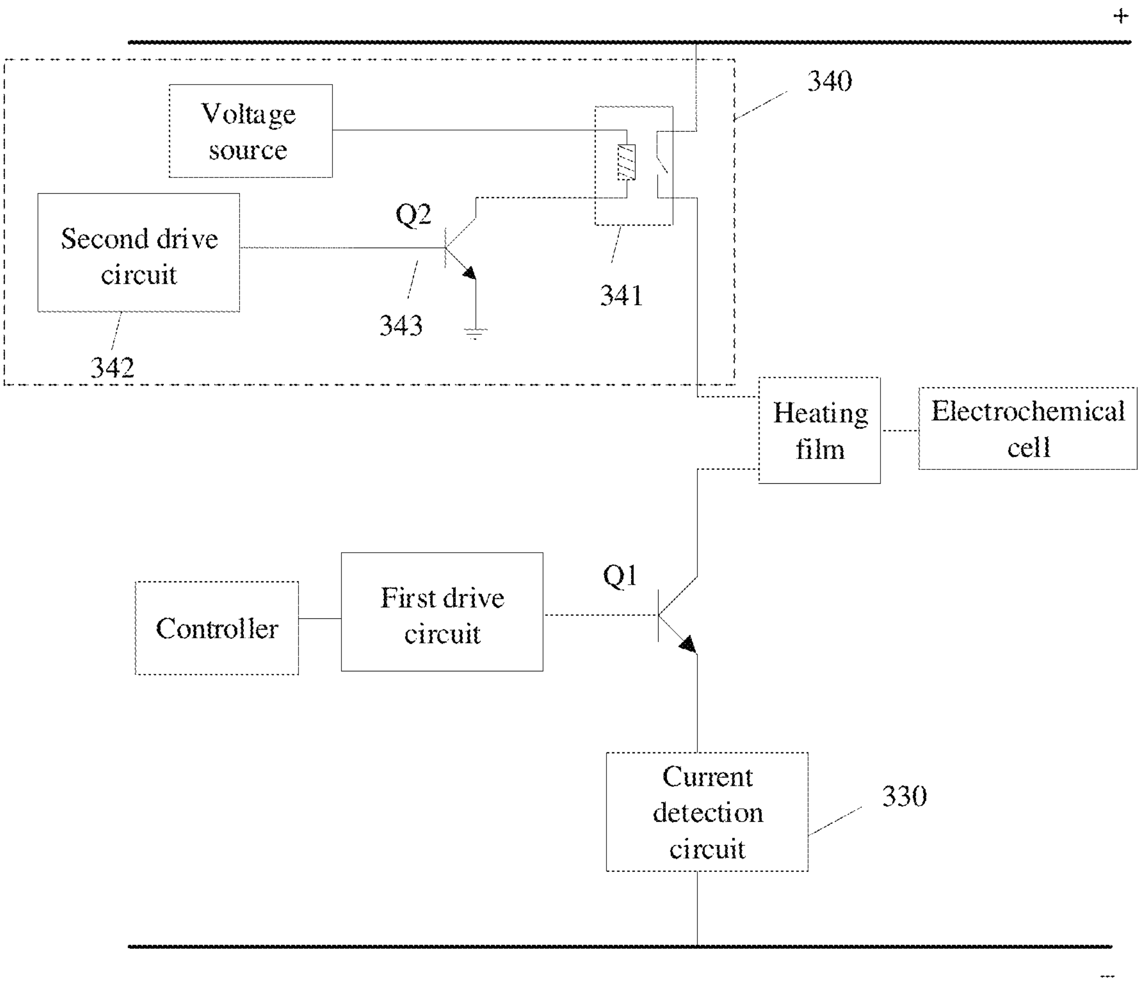
FIG. 8 is a schematic of an energy storage system according to an embodiment.

In an embodiment, as shown in FIG. 8, the isolating circuit 340 further includes a second drive circuit 342 and a second switching transistor 343. The second drive circuit 342 is configured to drive the second switching transistor 343 to be turned on or turned off. The second switching transistor 343 is connected in series to a coil of the isolating switch 341.

The second switching transistor 343 is turned on, the coil generates a magnetic field, and the isolating switch 341 is turned on; or the second switching transistor 343 is turned off, the coil does not generate a magnetic field, and the isolating switch 341 is turned off.

The isolating switch in this embodiment may be a relay, a circuit breaker, or the like. The following uses an example in which the isolating switch is a relay for description. In FIG. 8, one end of a coil of the relay is connected to a voltage source, and the other end of the coil of the relay is connected to the second switching transistor Q2.

Refer to FIG. 8. The second drive circuit is configured to drive the second switching transistor Q2 to be turned on or turned off, to turn on or turn off the relay. For example, when the second drive circuit outputs a high level, the second switching transistor Q2 is turned on, so that a loop in which the voltage source is connected to the relay is connected. After the coil of the relay is energized, the coil that flows through the relay generates a magnetic field. The magnetic field adsorbs an armature to act, so that a contact of the relay is closed. In this way, a voltage between the positive direct current bus and the negative direct current bus is applied to the heating film, and the heating film starts to operate. In this case, the heating film starts to heat the electrochemical cell.

When the second drive circuit outputs a low level, the second switching transistor Q2 is turned off, so that a loop in which the voltage source is connected to the relay is disconnected. No current flows through the coil of the relay, and the coil of the relay does not generate a magnetic field, so that a contact of the relay is opened. In this way, a voltage between the positive direct current bus and the negative direct current bus is not applied to the heating film, and the heating film stops operating. In this case, the heating film stops heating the electrochemical cell.

Therefore, when the current detection circuit detects that the current flowing through the first switching transistor is not zero, it indicates that the first switching transistor is faulty, and the first switching transistor cannot be turned on. In this case, the controller controls the second drive circuit to output the low level, to turn off the isolating switch. When the current detection circuit detects that the current flowing through the first switching transistor is zero, it indicates that the first switching transistor is not faulty. In this case, the controller controls the second drive circuit to output the high level, to turn on the isolating switch. Further, when the isolating switch is turned off, because the isolating circuit includes the isolating switch, physical isolation can be implemented, and isolation reliability can be improved.

Figure 9:
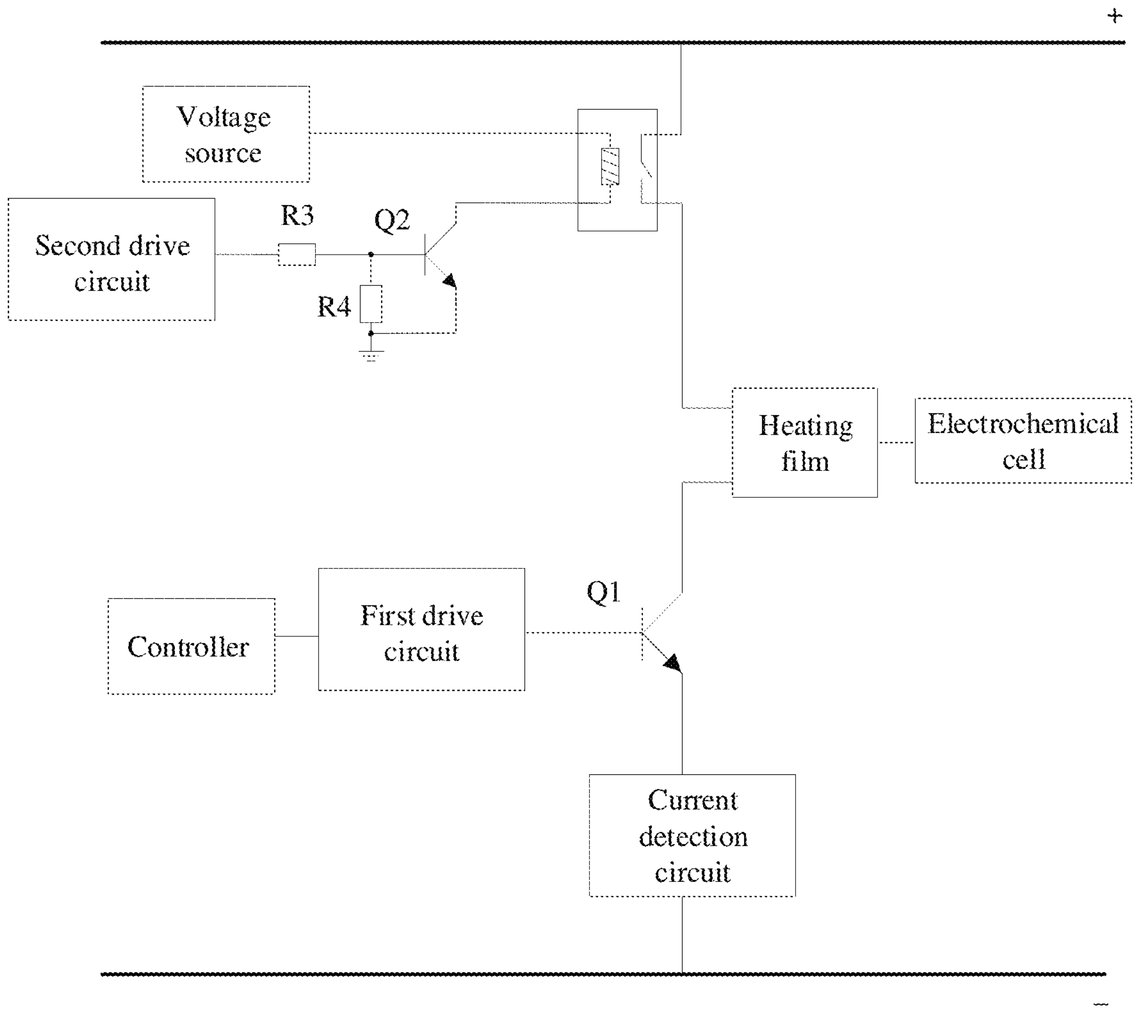
FIG. 9 is a schematic of an energy storage system according to an embodiment.

FIG. 9 is a schematic of yet another energy storage system according to an embodiment.

In an embodiment, a resistor R3 is further connected in series between a second drive circuit and a base of a second switching transistor.

In this embodiment, a voltage of a drive signal output by the second drive circuit is high. If there is no resistor R3, the second switching transistor Q2 may be damaged. For example, it is assumed that the voltage corresponding to the drive signal output by the second drive circuit is 12 V. If there is no resistor R3, a current corresponding to the 12 V voltage is input to the base of the second switching transistor Q2, and the current may be greater than a limiting current that can be borne by the base of the second switching transistor Q2, which causes damage to the second switching transistor Q2.

However, in this embodiment, because the second drive circuit is connected to the base of the second switching transistor Q2 through the resistor R3, the current corresponding to the voltage output by the second drive circuit flows into the base of the second switching transistor Q2 through the resistor R3. A resistance value of a loop in which the first drive circuit drives the Q2 through the resistor R3 increases, so that a base current flowing into the first switching transistor Q2 can be reduced, and damage to the second switching transistor Q2 can be avoided.

For example, a turn-on voltage of the second switching transistor Q2 is still 3.4 V. It is assumed that a voltage corresponding to a high-level signal output by the second drive circuit is 12 V. If a resistance value of the resistor R3 is sufficiently large, the resistor R3 may reduce the base current flowing into the second switching transistor Q2 to be less than the limiting current that can be borne by the base of the second switching transistor Q2. For example, it is assumed that the limiting current that can be borne by the base of the second switching transistor Q2 is 5 mA. When the resistance value of the resistor R3 is sufficiently large, for example, 1000Ω, the base current flowing into the second switching transistor Q2 may be reduced, for example, reduced to 4 mA, which is less than the limiting current that can be borne by the base of the second switching transistor Q2, so that damage to the second switching transistor Q2 can be avoided.

In this embodiment, because the resistor R3 is connected in series between the second drive circuit and the base of the second switching transistor, impedance of the loop in which the second drive circuit drives the second switching transistor through the resistor R3 increases. Therefore, the current flowing into the base of the second switching transistor can be reduced, so that damage to the second switching transistor can be avoided.

In an embodiment, a connection point of the second drive circuit and the second switching transistor Q2 is connected to a reference ground through a resistor R4.

In this embodiment, parasitic capacitance may exist in the second switching transistor Q2, and existence of the parasitic capacitance causes a transmission delay of the signal. When the parasitic capacitance of the second switching transistor Q2 is large, rise time and fall time of the signal increase, which affects a response speed of the second switching transistor Q2. For example, if there is no resistor R4, when the second drive circuit outputs a high-level signal, a turn-on speed of the second switching transistor Q2 is affected; or when the first drive circuit outputs a low-level signal, a turn-off speed of the second switching transistor Q2 is affected.

In this embodiment, because the resistor R4 is designed, and the base of the second switching transistor Q2 is connected to the reference ground through the resistor R4, energy on the parasitic capacitance may be discharged through the resistor R4, so that a turn-on or turn-off speed of the second switching transistor Q2 caused by the parasitic capacitance can be reduced.

In addition, the resistor R4 may also play a role of reliably turning off the second switching transistor Q2. For example, when the first drive circuit outputs the low-level signal, the second switching transistor Q2 is turned off. However, because the voltage output by the second drive circuit is transmitted to the base of the second switching transistor Q2 through a line on a PCB, coupling interference occurs, which causes incorrect turn-on of the second switching transistor Q2. In this embodiment, because the resistor R4 is designed, and the other end of the resistor R4 is connected to the reference ground, a base voltage of the second switching transistor Q2 can be pulled down, and reliable turn-off of the second switching transistor Q2 can be ensured.

Figure 10:
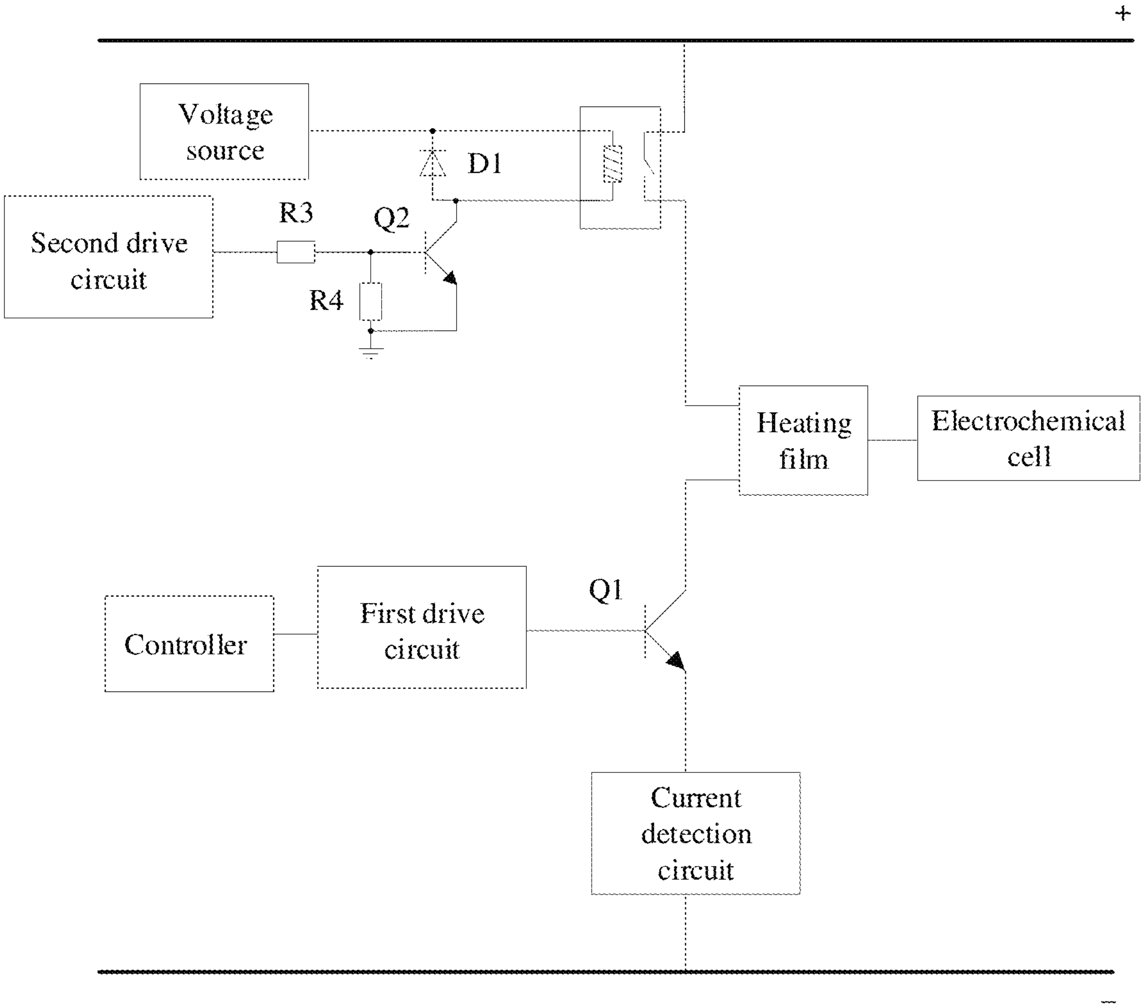
FIG. 10 is a schematic of an energy storage system according to an embodiment.

FIG. 10 is a schematic of yet another energy storage system according to an embodiment.

In an embodiment, an isolating switch is further connected in parallel to a diode D1, and an anode of the diode D1 is connected to a connection point of a collector of a second switching transistor Q2 and the isolating switch.

The diode D1 in this embodiment may provide a discharge loop for a coil of a relay. In a normal case, the second switching transistor Q2 is turned on, and a voltage source is turned on through a loop formed by the isolating switch and the second switching transistor Q2. When the second switching transistor Q2 is turned off, the isolating switch is turned off, and the coil of the relay forms counter electromotive force. Because the diode D1 is designed, a current on the coil of the relay may be discharged through the diode D1, to reduce interference of the counter electromotive force of the coil of the relay, and improve performance of the isolating switch.

Figure 11:
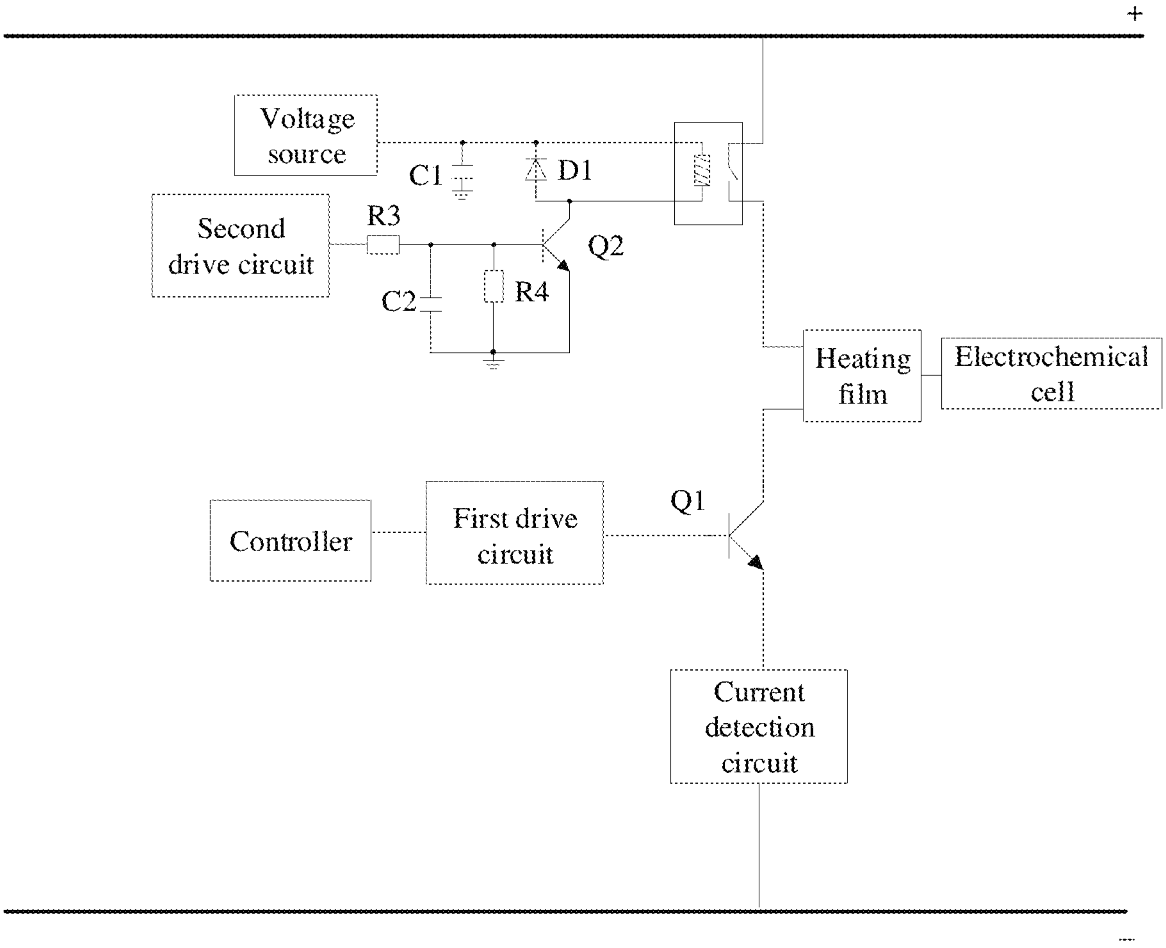
FIG. 11 is a schematic of an energy storage system according to an embodiment.

FIG. 11 is a schematic of yet another energy storage system according to an embodiment.

In an embodiment, an isolating circuit further includes a capacitor C1. One end of the capacitor C1 is connected to a connection point of a voltage source and an isolating switch, and the other end of the capacitor C1 is connected to a reference ground.

In this embodiment, the voltage source outputs a direct current, and a clutter may exist in the direct current. The capacitor C1 may filter out the clutter in a current point, so that the direct current input by the voltage source to an isolating switching transistor is a smooth direct current, and interference of the clutter to turn-on or turn-off of the isolating switch can be reduced.

In an embodiment, the isolating circuit further includes a capacitor C2. One end of the capacitor C2 is connected to a connection point of a second drive circuit and a second switching transistor, and the other end of the capacitor C2 is connected to a reference ground.

In this embodiment, the second drive circuit outputs a high-level signal or a low-level signal. Because a voltage output by the second drive circuit is transmitted to a base of the second switching transistor Q2 through a line on a PCB, coupling interference occurs, which causes a misoperation of the second switching transistor Q2. A resistor R4 and the capacitor C2 in this embodiment may filter out interference, so that the signal input to the base of the second switching transistor is smooth, and the misoperation of the second switching transistor caused by interference can be avoided.

Figure 12:
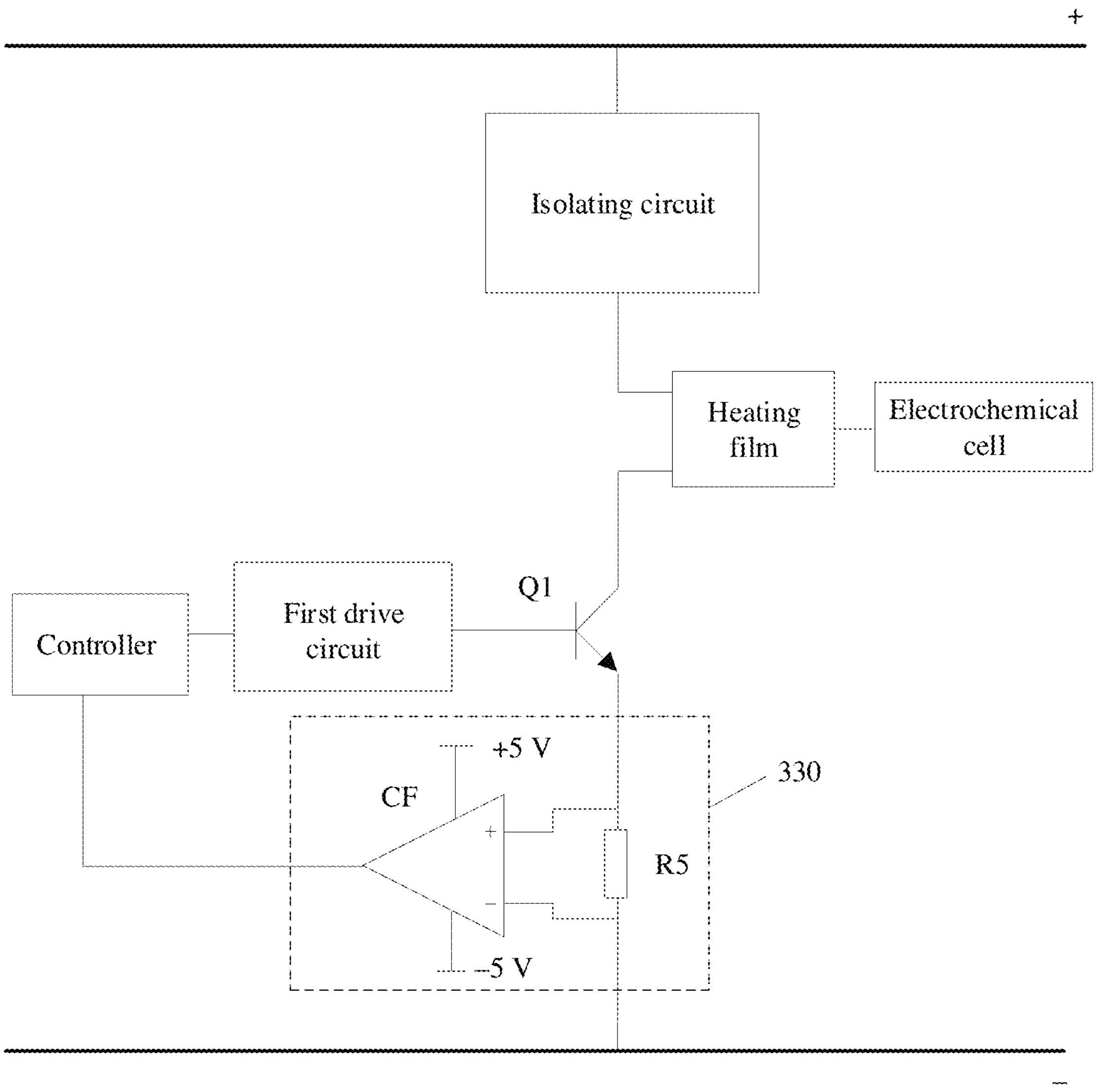
FIG. 12 is a schematic of an energy storage system according to an embodiment.

FIG. 12 is a schematic of yet another energy storage system according to an embodiment.

In an embodiment, a current detection circuit includes a first resistor R5 and an operational amplifier CF. The first resistor R5 is connected in series to a first switching transistor. A non-inverting input end of the operational amplifier CF is connected to one end of the first resistor R5, and an inverting input end of the operational amplifier CF is connected to the other end of the first resistor R5. An output end of the operational amplifier CF is connected to a controller.

In this embodiment, because the non-inverting input end of the operational amplifier CF and the inverting input end of the operational amplifier CF are respectively connected to the two ends of the first resistor R5, a voltage between the input ends of the operational amplifier CF is a voltage between the two ends of the first resistor R5. A voltage at the output end of the operational amplifier=K*$U_{R5}$, where K is a factor of proportionality, and $U_{R5}$ is the voltage between the two ends of the first resistor R5.

It is assumed that a rated current of a heating film is 30 A, a resistance value of the first resistor R5 is 5Ω, and the factor of proportionality of the operational amplifier CF is 50. When a voltage between a positive direct current bus and a negative direct current bus is 360 V, and operating power of the heating film is 15 kW, a current flowing through the first resistor is 41.67 A, and the voltage between the two ends of the first resistor R5 is 41.67*5=208.35 V. An amplified voltage, of the first resistor R5, obtained by the controller is 10417.5 V. The controller deduces, based on the voltage value, that a current flowing through the heating film is greater than the rated current of the heating film. A duty cycle of a pulse signal may be set. For example, the duty cycle may be set to 0.6. In this case, an average operating current of the heating film for heating an electrochemical cell in each periodicity is 25 A, which is less than the rated current of the heating film.

When the voltage between the positive direct current bus and the negative direct current bus increases, the operating power of the heating film changes to 18 kW, and an operating current of the heating film changes to 50 A. In this case, the amplified voltage, of the first resistor R5, obtained by the controller is 12500 V, and the controller deduces, based on the voltage value, that the current flowing through the heating film is greater than the rated current of the heating film. The controller may further reduce the duty cycle of the pulse signal output by a first drive circuit, for example, may adjust the duty cycle from 0.6 to 0.5. In this case, the average operating current of the heating film for heating the electrochemical cell in each periodicity is 25 A, that is, is still less than the rated current of the heating film, so that a risk of damage to the heating film can be reduced.

When the voltage between the positive direct current bus and the negative direct current bus decreases, the operating power of the heating film changes to 7 kW, and an operating current of the heating film changes to 20 A. In this case, the amplified voltage, of the first resistor R5, obtained by the controller is 5000 V, and the controller deduces, based on the voltage value, that the current flowing through the heating film is less than the rated current. The controller may increase the duty cycle of the pulse signal output by a first drive circuit, for example, may adjust the duty cycle from 0.6 to 1.0. In this case, the average operating current of the heating film for heating the electrochemical cell in each periodicity is 20 A. Although the duty cycle is adjusted to 1, that is, the heating film continuously heats the electrochemical cell at the operating current of 20 A, the heating film is not damaged, and a requirement for battery temperature raising can be further met to a greatest extent.

Figure 13:
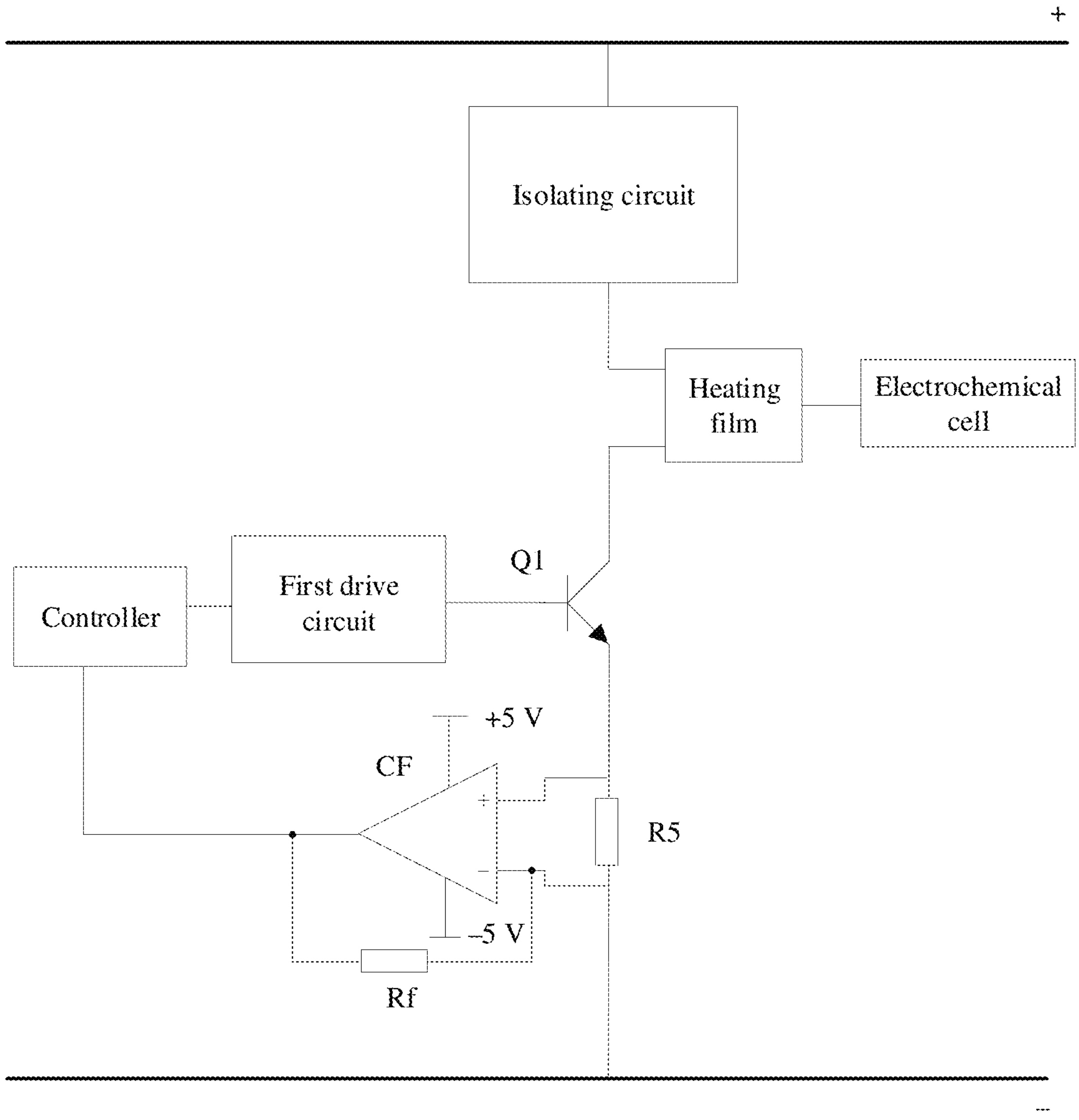
FIG. 13 is a schematic of an energy storage system according to an embodiment.

Although the operational amplifier CF may amplify the voltage between the two ends of the first resistor R5, an excessively large amplification factor of the operational amplifier CF may affect sampling precision. Therefore, as shown in FIG. 13, in an embodiment, a resistor Rf is further connected in series between the inverting input end of the operational amplifier and the output end of the operational amplifier.

As described above, the voltage at the output end of the operational amplifier=K*$U_{R3}$. If there is no resistor Rf, the factor of proportionality of the operational amplifier may be tens of thousands, for example, K=10000. When $U_{R3}$=4 V, the voltage at the output end of the operational amplifier is 40000 V. Further, when the operational amplifier has an offset voltage, an excessively large factor of proportionality affects sampling precision of the operational amplifier. For example, when $U_{R3}$=4 V, the offset voltage of the operational amplifier is 0.1 V. Due to existence of the offset voltage of the operational amplifier, the voltage input by the input ends of the operational amplifier may be 4.1 V, and the voltage output by the output end of the operational amplifier is 41000 V. This is different from a case in which there is no offset voltage in that the voltage output by the output end of the operational amplifier is 1000 V more, which results in inaccurate sampling.

In this embodiment, because the resistor Rf is designed, a resistance value of the resistor Rf is adjusted, so that the factor of proportionality of the operational amplifier can be adjusted, for example, K=50. When $U_{R3}$=4 V, the voltage at the output end of the operational amplifier is 200 V. Even if there is the offset voltage, for example, the voltage input by the input end of the operational amplifier is 4.1 V, the voltage output by the output end of the operational amplifier is 205 V. This is different from a case in which there is no offset voltage in that the voltage output by the output end of the operational amplifier is 5 V more. In this way, a voltage deviation caused by the offset voltage of the operational amplifier can be reduced, and sampling precision can be improved.

Figure 14:
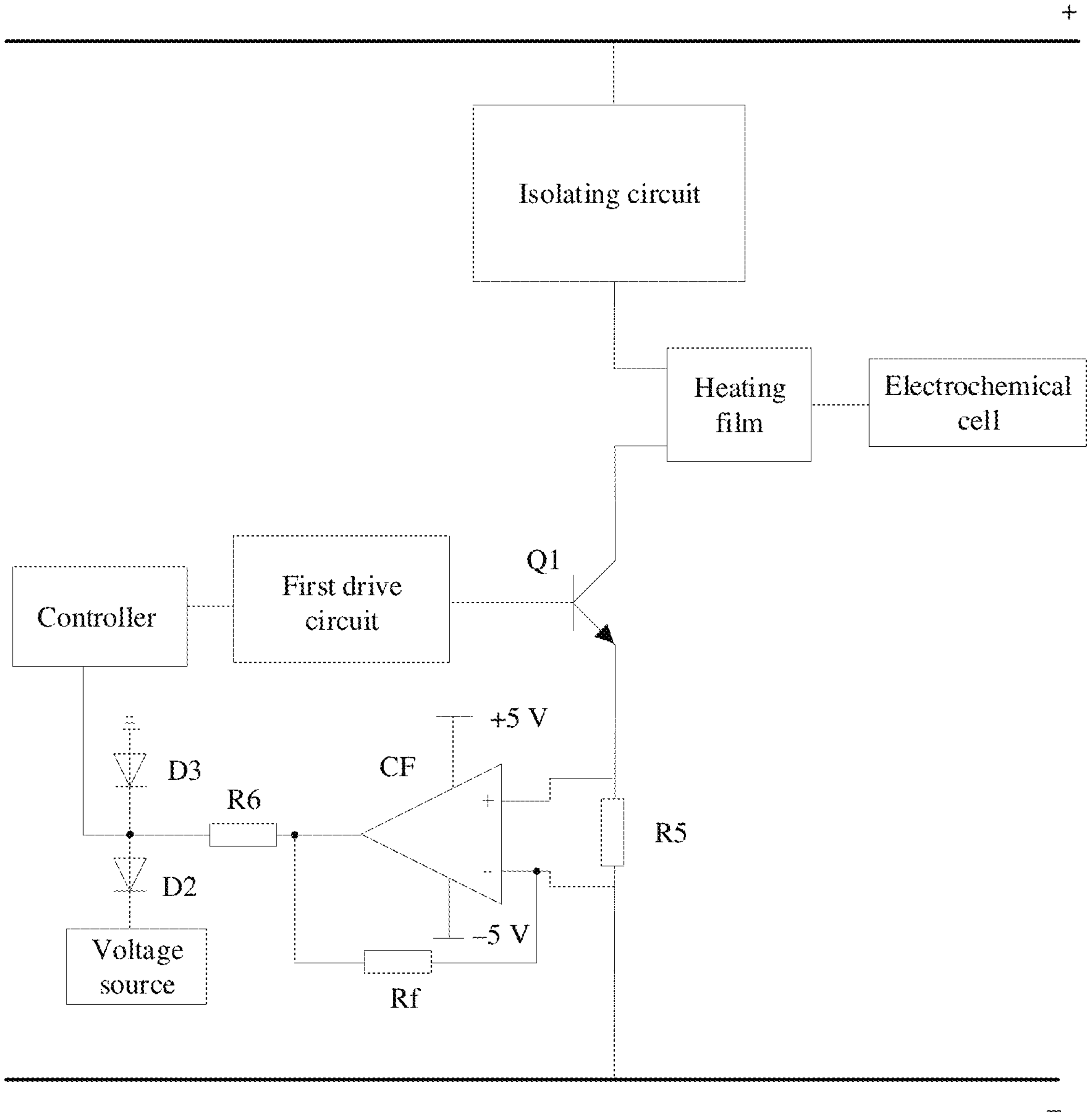
FIG. 14 is a schematic of an energy storage system according to an embodiment.

In an embodiment, as shown in FIG. 14, a second resistor R6 is further connected in series between the output end of the operational amplifier CF and the controller.

In this embodiment, when the output end of the operational amplifier is short-circuited to a positive supply rail or the output end of the operational amplifier is short-circuited to a negative supply rail, a voltage flowing into a pin of the controller is large, which causes damage to the controller. Therefore, a second resistor R6 may be connected between the output end of the operational amplifier CF and the controller, and the second resistor R6 may reduce the pin voltage flowing into the controller, so that a risk of damage to the pin of the controller can be reduced.

In an embodiment, the current detection circuit further includes two diodes D2 and D3 and a voltage source.

An anode of one diode D2 of the diodes is connected to a connection point of the second resistor R6 and the controller, and a cathode of the diode D2 of the diodes is connected to the voltage source. A cathode of the other diode D3 is connected to the connection point of the second resistor R6 and the controller, and an anode of the other diode D3 is connected to a reference ground.

In this embodiment, a main function of the two diodes D2 and D3 is to avoid an excessively high pin voltage of the controller, so that the risk of damage to the pin of the controller is reduced. For example, ±5 V dual power supplies supply power to the operational amplifier, and a voltage output by the voltage source is 3.3 V. When the output end of the operational amplifier is short-circuited to the positive supply rail, the output end of the operational amplifier outputs a voltage of 5 V. Because the voltage of the voltage source is 3.3 V, the diode D2 is conducted. If there is no resistor R6, a voltage at a point a can be 5 V, and a voltage range that can be borne by the pin of the controller can be −0.3 V to 3.6 V. The pin voltage input to the controller is greater than a voltage that can be borne by the pin of the controller, which is prone to causing damage to the pin of the controller. However, in this embodiment, because the resistor R6 is designed, assuming that a resistance value of the resistor R6 is 2000, a current If flowing through the resistor R6=(5−3.3)/2000=0.85 mA. The pin voltage input to the controller=3.3 V+$U_{D2}$. Based on a current forward characteristic of the diode, the voltage and the current are approximately in a linear relationship. Because If decreases, $U_{D2}$ decreases. For example, a voltage corresponding to 0.85 mA is 0.1 V. In this case, the pin voltage input to the controller=3.3 V+$U_{D2}$=3.4 V, which is less than the voltage that can be borne by the pin of the controller. In this way, the risk of damage to the pin of the controller can be reduced.

When the output end of the operational amplifier is short-circuited to the negative supply rail, the output end of the operational amplifier outputs a voltage of −5 V. Because the anode of the diode D3 is connected to the reference ground, the diode D3 is conducted. If there is no resistor R6, a voltage at a point a is −5 V, and the pin voltage input to the controller is also −5 V. A voltage range that can be borne by the pin of the controller can be −0.3 V to 3.6 V. The pin voltage input to the controller is greater than a voltage that can be borne by the pin of the controller, which is prone to causing damage to the pin of the controller. However, in this embodiment, because the resistor R6 is designed, assuming that a resistance value of the resistor R6 is 2000Ω, a current If flowing through the resistor R6=5/2000=2.5 mA. The pin voltage input to the controller is $U_{D3}$. Based on a current forward characteristic of the diode, the voltage and the current are approximately in a linear relationship. Because If decreases, $U_{D3}$ decreases. For example, a voltage corresponding to 2.5 mA is 0.3 V. In this case, the pin voltage input to the controller is −0.3 V, which is less than the voltage that can be borne by the pin of the controller. In this way, the risk of damage to the pin of the controller can be reduced.

Figure 15:
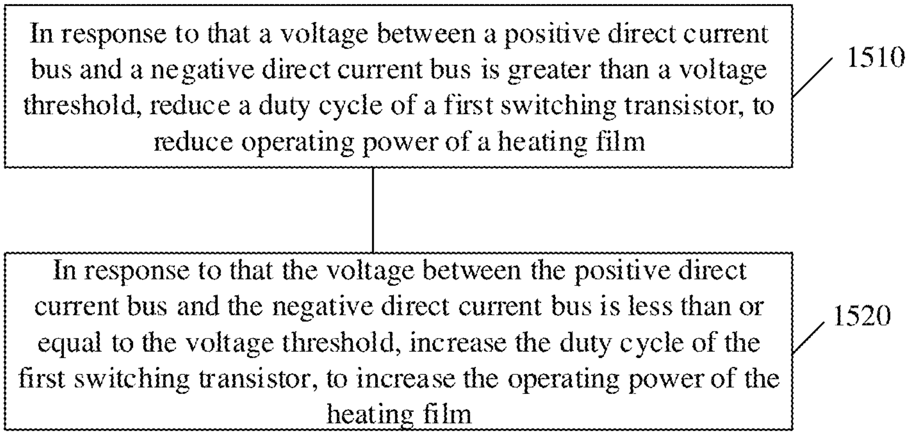
FIG. 15 is a diagram of a heating control method for a battery pack according to an embodiment.

As shown in FIG. 15, the embodiments further provide a heating control method for a battery pack. The method includes steps 1510 to 1520.

1510: If a voltage between a positive direct current bus and a negative direct current bus is greater than a voltage threshold, reduce a duty cycle of a first switching transistor, to reduce operating power of a heating film.

1520: If the voltage between the positive direct current bus and the negative direct current bus is less than or equal to the voltage threshold, increase the duty cycle of the first switching transistor, to increase the operating power of the heating film.

The first switching transistor and the heating film are connected in series, and then connected in parallel between the positive direct current bus and the negative direct current bus. The heating film is configured to heat an electrochemical cell of the battery pack.

In an embodiment, before the heating film operates, the method further includes: first turning on an isolating switch, and if a current flowing through the first switching transistor is not zero, then turning off the isolating switch; or first turning on an isolating switch, and if a current flowing through the first switching transistor is zero, then turning on the first switching transistor. The isolating switch is connected in series to the first switching transistor.

In an embodiment, the turning on an isolating switch includes: controlling a second drive circuit to output a high-level signal. A second switching transistor is turned on, and a coil in the isolating switch generates a magnetic field, to turn on the isolating switch. The second drive circuit is configured to drive the second switching transistor to be turned on or turned off. The second switching transistor is connected in series to the coil.

In an embodiment, the turning off the isolating switch includes: controlling the second drive circuit to output a low-level signal. The second switching transistor is turned off, and the coil in the isolating switch does not generate the magnetic field, to turn off the isolating switch. The second drive circuit is configured to drive the second switching transistor to be turned on or turned off. The second switching transistor is connected in series to the coil.

For specific content of the control method for the battery pack, refer to related content in the foregoing embodiments. Details are not described again.

In addition, the embodiments further provide a photovoltaic energy storage system. The photovoltaic energy storage system includes a power converter and the energy storage system in any one of the foregoing embodiments. The power converter is configured to convert a direct current from the energy storage system into an alternating current, and then send the alternating current to a power grid; or the power converter is configured to convert an alternating current from a power grid into a direct current, to charge the energy storage system.

For content of the energy storage system in the photovoltaic energy storage system, refer to related content in the foregoing embodiments. Details are not described again.

The foregoing descriptions are merely specific implementations of the embodiments, but are not intended as limiting. Any variation or replacement readily figured out by a person skilled in the art shall fall within the scope of the embodiments.

The invention claimed is:

1. An energy storage system comprising:

a positive direct current bus;

a negative direct current bus;

a battery pack, wherein the battery pack comprises an electrochemical cell, a heating film, a first switching transistor;

a current detection circuit configured to detect a current flowing through the first switching transistor, wherein the current detection circuit comprises a first resistor and an operational amplifier;

a controller; and a first drive circuit, wherein the heating film is configured to heat the electrochemical cell, the heating film and the first switching transistor are connected in series, and connected between the positive direct current bus and the negative direct current bus;

the first drive circuit is configured to output a pulse signal, to drive the first switching transistor to be turned on and turned off, the first resistor is connected in series to the first switching transistor, a non-inverting input end of the operational amplifier is connected to a first end of the first resistor, an inverting input end of the operational amplifier is connected to a second end of the first resistor, and an output end of the operational amplifier is connected to the controller.

2. The energy storage system according to claim 1, further comprising:

an isolating circuit that comprises an isolating switch, wherein the current detection circuit, the isolating switch, the heating film, and the first switching transistor are connected in series, and then connected in parallel between the positive direct current bus and the negative direct current bus.

3. The energy storage system according to claim 2, wherein the isolating circuit further comprises a second drive circuit and a second switching transistor, the second drive circuit is configured to drive the second switching transistor to be turned on or turned off, and the second switching transistor is connected in series to a coil of the isolating switch;

when the second switching transistor is turned on, the coil generates a magnetic field, and the isolating switch is turned on; and when the second switching transistor is turned off, the coil does not generate the magnetic field, and the isolating switch is turned off.

4. The energy storage system according to claim 1, wherein:

the current detection circuit further comprises a second resistor, a first diode, a second diode, and a voltage source;

the second resistor is connected in series between the controller and the output end of the operational amplifier;

an anode of the first diode is connected to a connection point of the second resistor and the controller, and a cathode of the first diode is connected to the voltage source; and a cathode of the second diode is connected to the connection point of the second resistor and the controller, and an anode of the second diode is connected to a reference ground.

5. The energy storage system according to claim 1, wherein;

the current detection circuit further comprises a second resistor, a first diode, a second diode, and a voltage source;

the second resistor is connected in series between the controller and the output end of the operational amplifier;

an anode of the first diode is connected to a connection point of the second resistor and the controller, and a cathode of the first diode is connected to the voltage source; and a cathode of the second diode is connected to the connection point of the second resistor and the controller, and an anode of the second diode is connected to a reference ground.

6. A heating control method for a battery pack comprising:

detecting, with a current detection circuit, a current flowing through a first switching transistor, wherein:

the current detection circuit comprises a first resistor and an operational amplifier, the first resistor is connected in series to the first switching transistor, a non-inverting input end of the operational amplifier is connected to a first end of the first resistor, an inverting input end of the operational amplifier is connected to a second end of the first resistor, and an output end of the operational amplifier is connected to the controller;

when a voltage between a positive direct current bus and a negative direct current bus is greater than a voltage threshold, reducing a duty cycle of the first switching transistor, to reduce operating power of a heating film, wherein the first switching transistor and the heating film are connected in series, and then connected in parallel between the positive direct current bus and the negative direct current bus, and the heating film is configured to heat an electrochemical cell of the battery pack; or when the voltage between the positive direct current bus and the negative direct current bus is less than or equal to the voltage threshold, increasing a duty cycle of the first switching transistor, to increase operating power of a heating film.

7. The heating control method according to claim 6, wherein before the heating film operates, further comprising:

turning on an isolating switch, and after a current flowing through the first switching transistor is not zero, turning off the isolating switch, wherein the isolating switch is connected in series to the first switching transistor.

8. The heating control method according to claim 7, wherein turning on the isolating switch further comprises:

controlling a second drive circuit to output a high-level signal, wherein a second switching transistor is turned on, and a coil in the isolating switch generates a magnetic field, to turn on the isolating switch; and the second drive circuit is configured to drive the second switching transistor to be turned on or turned off, and the second switching transistor is connected in series to the coil.

9. The heating control method according to claim 7, wherein turning off the isolating switch further comprises:

controlling the second drive circuit to output a low-level signal, wherein the second switching transistor is turned off, and the coil in the isolating switch does not generate the magnetic field, to turn off the isolating switch; and the second drive circuit is configured to drive the second switching transistor to be turned on or turned off, and the second switching transistor is connected in series to the coil.

10. The heating control method according to claim 8, wherein turning off the isolating switch further comprises:

controlling the second drive circuit to output a low-level signal, wherein the second switching transistor is turned off, and the coil in the isolating switch does not generate the magnetic field, to turn off the isolating switch; and the second drive circuit is configured to drive the second switching transistor to be turned on or turned off, and the second switching transistor is connected in series to the coil.

11. A photovoltaic energy storage system, wherein the photovoltaic energy storage system comprises a power converter and the energy storage system according to claim 1.

12. The energy storage system of claim 1, wherein the controller is further configured to:

after a voltage between the positive direct current bus and the negative direct current bus is greater than a voltage threshold, reduce a duty cycle of the pulse signal to reduce operating power of the heating film.

13. The energy storage system of claim 1, wherein the controller is further configured to:

after a voltage between the positive direct current bus and the negative direct current bus is less than or equal to a voltage threshold, increase a duty cycle of the pulse signal to increase operating power of the heating film.

14. The energy storage system of claim 1, wherein, before the heating film operates, the controller is further configured to:

turn on the isolating switch, and after the current flowing through the first switching transistor is not zero, turn off the isolating switch.

15. The energy storage system of claim 1, wherein, before the heating film operates, the controller is further configured to:

turn on the isolating switch, and after the current flowing through the first switching transistor is zero, turn on the first switching transistor.

16. The method of claim 6, wherein before the heating film operates, further comprising:

turning on an isolating switch; and, after a current flowing through the first switching transistor is zero, turning on the first switching transistor.

17. A photovoltaic energy storage system of claim 11, wherein the power converter is configured to:

convert a direct current from the energy storage system into an alternating current, and send the alternating current to a power grid.

18. A photovoltaic energy storage system of claim 11, wherein the power converter is configured to:

convert an alternating current from a power grid into a direct current to charge the energy storage system.

* * * * *